(12) United States Patent
Healey (10) Patent No.: US 7,165,623 B2
(45) Date of Patent: Jan. 23, 2007

(54) FARRIER'S MEASURING TOOL AND METHOD FOR USING

(76) Inventor: Pete Healey, P.O. Box 704, Los Olivos, CA (US) 93441

( * ) Notice: Subject to any disclaimer, the term of this patent is extended or adjusted under 35 U.S.C. 154(b) by 0 days.

(21) Appl. No.: 11/432,874

(22) Filed: May 12, 2006

(65) Prior Publication Data

US 2006/0201686 A1    Sep. 14, 2006

(51) Int. Cl.
*A01L 11/00* (2006.01)

(52) U.S. Cl. ...................................................... 168/45

(58) Field of Classification Search ............ 168/45–47, 168/48.1; 33/195; 119/472, 498, 499
See application file for complete search history.

(56) References Cited

U.S. PATENT DOCUMENTS

| | | | | |
|---|---|---|---|---|
| 373,886 A * | 11/1887 | Delander | ..................... | 33/3 R |
| 789,100 A * | 5/1905 | Murray | ........................ | 33/195 |
| 1,497,492 A * | 6/1924 | Engel | ............................ | 33/494 |
| 2,593,385 A * | 4/1952 | Digate | .......................... | 33/3 R |
| 4,214,370 A * | 7/1980 | Beaston | ....................... | 33/195 |
| 4,813,148 A * | 3/1989 | Finnegan | ..................... | 33/195 |
| 6,360,824 B1 * | 3/2002 | Singley | ........................ | 168/45 |
| 6,907,670 B1 * | 6/2005 | Teed | ............................ | 33/195 |

\* cited by examiner

*Primary Examiner*—Son T. Nguyen
(74) *Attorney, Agent, or Firm*—Michael G. Petit (57) ABSTRACT

A farrier's tool and a method of using the tool for preparing the hoof of a horse to receive a shoe. The tool is a symmetrical measuring device used for determining the position of the breakover point on a horse's hoof. After the position of the break-over point is determined, the portion of the hoofwall forward of the breakover point is beveled by means of a trimming tool to reduce leverage on the underlying coffin bone, particularly during locomotion. A horseshoe is then shaped to conform to the contour of the trimmed and beveled hoof and nailed to the hoof. The method provides means for accurately aligning the hoof capsule with the coffin bone in the hoof.

2 Claims, 8 Drawing Sheets

FARRIER'S MEASURING TOOL AND METHOD FOR USING

BACKGROUND OF THE INVENTION

1. Field of the Invention

The present invention relates to a farrier's tool and, more particularly, to a measuring tool operable for determining the break-over point of a horses hoof and to a method for preparing the hoof for shoeing.

2. Prior Art

Horses need periodic shoeing to protect their hooves and prevent damage to their feet. Typically, the wear and tear on the shoe and the normal growth and expansion of the hoof requires filing, trimming and reshoeing every six to eight weeks. In accordance with the prior art, prior to installing a horseshoe, the farrier first removes the old shoe then determines the flatness and the plane of the ground-contacting portion of the hoof. The farrier then makes corrections by peeling, cutting and/or filing to shape and flatten the bottom of the hoof. The width of the hoof is then measured and the correct horseshoe selected, shaped as required, and placed against the corrected bottom of the hoof and nailed to the hoofwall.

Errors in shoeing can lead to damage to the horse's leg and foot. The horse's feet and legs can become damaged if unnecessary strain is placed on components of the foot such as bones, tendons, ligaments and the like, which may cause the horse to go lame. The prior art method for preparing the hoof of a horse for shoeing pays particular attention to the lateral width and flatness of the foot. U.S. Pat. No. 4,813,148 discloses a device and method for determining the flatness of a horse's hoof and for making corrections therein. U.S. Pat. No. 5,996,698 discloses a farrier rasp that includes means for measuring the width of a horse's hoof at the same time the hoof is being filed and shaped for shoeing, thereby avoiding the necessity for the additional step of lifting the foot of the horse to measure it with a different instrument after filing.

Notwithstanding the importance of the flatness of the foot, the contour of the anterior (or forward) portion of the toe of the hoof is also important. A particular problem that may result from improper horseshoeing is injury to the coffin bone in the foot arising from pressure exerted by the hard, horny overlying hoofwall away from the coffin bone. When a horse lifts its hoof to walk, the heel leaves the ground first, temporarily transferring weight to the toe. The rising foot rotates around a transverse axis in the foot which is called the break-over axis. If the forward portion of the toe (or shoe) is flat, the weight transferred thereto creates a high torque which forces the hoofwall away from the coffin bone which can result in damage thereto. There is a need for a method for identifying the portion of the hoof forward of the break-over plane and tapering or beveling the forward edge of the lower, ground-contacting surface of the hoof such that the pressure exerted by the hoofwall and the coffin bone is evenly distributed over the interface therebetween, particularly when the horse is walking or running.

SUMMARY

The present invention is directed to a a method for identifying the break-over point on a hoof and the provision of a farrier's tool operable for determining the portion of a horse hoof that must be beveled after the position of the break-over point has been identified. To achieve these and other advantages and in accordance with the purpose of the invention to substantially obviate one or more of the limitations of the related art as embodied and broadly described herein, the invention includes an elongate, preferably transparent, ruler having a center indicia such as, for example, a hole in the center thereof. Sequential gradations are disposed on the ruler, with gradations increasing symmetrically from zero to about 80 mm in each direction laterally from the center of the hole.

The method for preparing a hoof to receive a shoe includes the steps of: (a) identifying and marking the break-over point on the bottom of the hoof; (b) placing the tool against the bottom of the hoof oriented in an anterior-posterior direction with the center indicia of the tool overlying the break-over point; then (c) measuring the distance from the center indicia (break-over point) to the heel bulb to determine a bevel distance; then (d) measuring the bevel distance forward of the center indicia and marking a transverse bevel line on the hoof; then (e) beveling the portion of the hoof forward of the bevel line. A shoe is shaped to conform to the contour of the trimmed hoof and nailed thereto.

The features of the invention believed to be novel are set forth with particularity in the appended claims. However the invention itself, both as to organization and method of operation, together with further objects and advantages thereof may be best understood by reference to the following description taken in conjunction with the accompanying drawings.

DESCRIPTION OF THE PREFERRED EMBODIMENT

Figure 1:
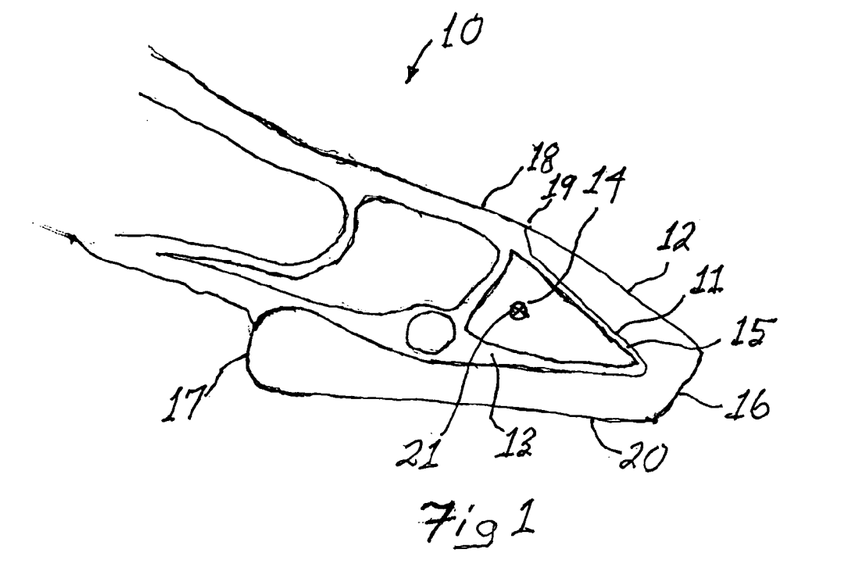
FIG. 1 is a cross-sectional view of the foot of a horse illustrating the anatomical relationship between the coffin bone and the hoof capsule.

Turning now to FIG. 1, the anatomy of the foot 10 of an unshod horse is shown in longitudinal cross-sectional view. The interior surface 111 of the hoof 12 or "hoofwall" defines a hoof capsule 13 that anteriorly and laterally surrounds a coffin bone 14 and is separated therefrom by a lamina 15. The hoof 12 has an anterior or forward edge 16 and a heelbulb 17 on the rearward edge. The junction between the upper surface of the hoof 12 and the skin 18 is the coronet band 19. In addition to the lower surface 20 of the hoof 12 being flat, the contour of the anterior (or forward) portion 16 of the hoof 12 is also important. As mentioned earlier, a particular problem that may result from improper horseshoeing is injury to the coffin bone 14 in the foot 10 arising from uneven pressure exerted by the hard, horny overlying hoofwall 11 away from the underlying coffin bone.

When a horse lifts its hoof to walk, the heel 17 leaves the ground first, temporarily transferring weight disproportionately to the anterior or forward edge 16 of the hoof. The rising foot rotates around a transverse axis 21 in the foot which is called the break-over axis. If the lower surface of the forward portion of the hoof 12 (or shoe) is flat, the weight transferred thereto creates a high torque which forces the hoofwall 11 away from the coffin bone 14 which can result in damage thereto.

There is, therefor, a need for a method for identifying the forward edge of the lower, ground-contacting surface 20 of the hoof that must be tapered or beveled such that the pressure exerted by the hoofwall 11 away from the coffin bone 14 is dissipated over the interface or lamina 15 therebetween, particularly when the horse is walking or running. The present invention provides a method and device for determining the center point on a horse's foot that serves as a reference point for measuring the position of the break-over point of the hoof.

Figure 2:
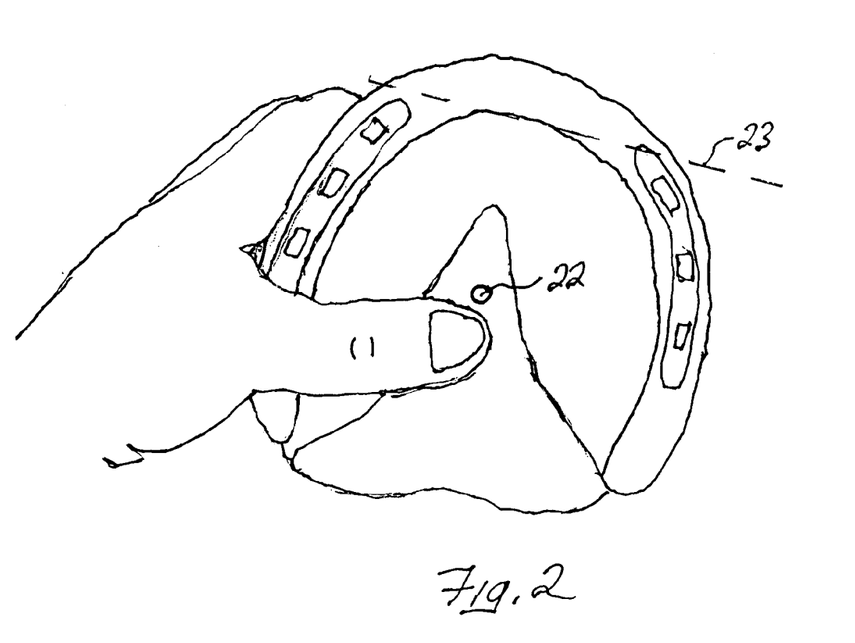
FIG. 2 is a bottom view of a shod hoof illustrating the apparent geometric center of the hoof.

FIG. 2 is a bottom view of a shod hoof illustrating the apparent geometric center of the hoof. The apparent geometric center 22 of the hoof 12 does not provide a accurate reference point for measuring the position of the break-over line 23 on the hoof. A method for identifying a more accurate center point is needed and is provided in FIGS. 3–6.

Figure 3:
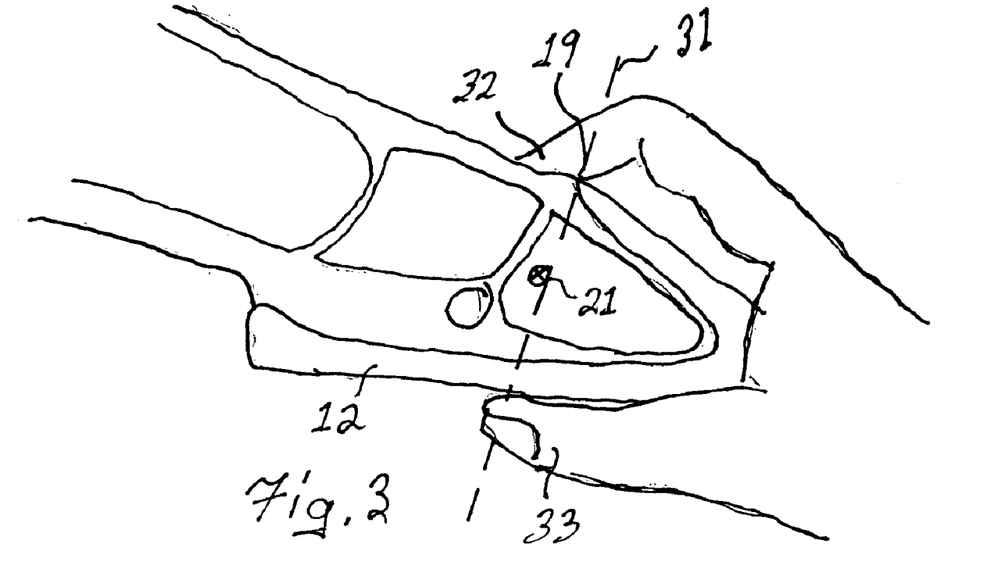
FIG. 3 is a cross-sectional longitudinal view of a horse's foot showing the use of the index finger and thumb by a farrier to determine the actual center of the hoof used for determining the break-over point.
Figure 4:
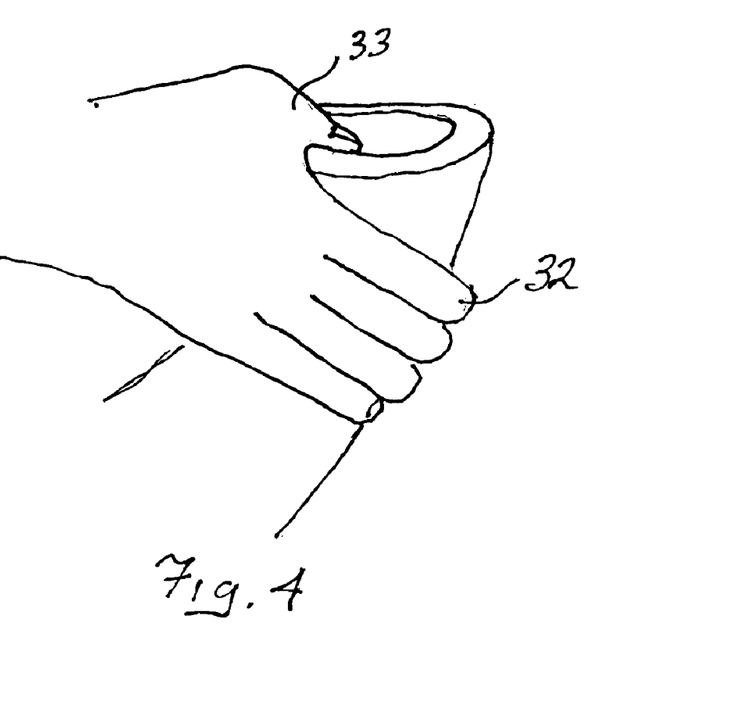
FIG. 4 is a side view of a horse's foot showing the use of the index finger and thumb by a farrier to determine the actual center of the hoof used for determining the break-over point.

FIG. 3 is a cross-sectional longitudinal view of a horse's foot. If a line 31 is drawn between the coronet band 19 at the center of the top of the foot that transects the center of the transverse axis 21, the line 31 will exit the bottom of the hoof at the "actual center" of the hoof. The actual center has been found to provide a reference point for determining the break-over line on the hoof. FIG. 3 illustrates a simple method for determining the actual center of the hoof. The index finger 32 of the farrier is first placed on the center of the coronet band and the farrier's thumb 33 is moved in opposition to the index finger until it comes in contact with the bottom of the hoof. The point of contact of the thumb with the bottom of the hoof is the actual center of the hoof and may be used by a farrier to determine the break-over point as will be discussed below. FIG. 4 is a side, somewhat perspective view of a horse's foot as illustrated in FIG. 3 showing the use of the index finger 32 and thumb 33 by a farrier to determine the actual center of the hoof used for determining the break-over point.

Figure 5:
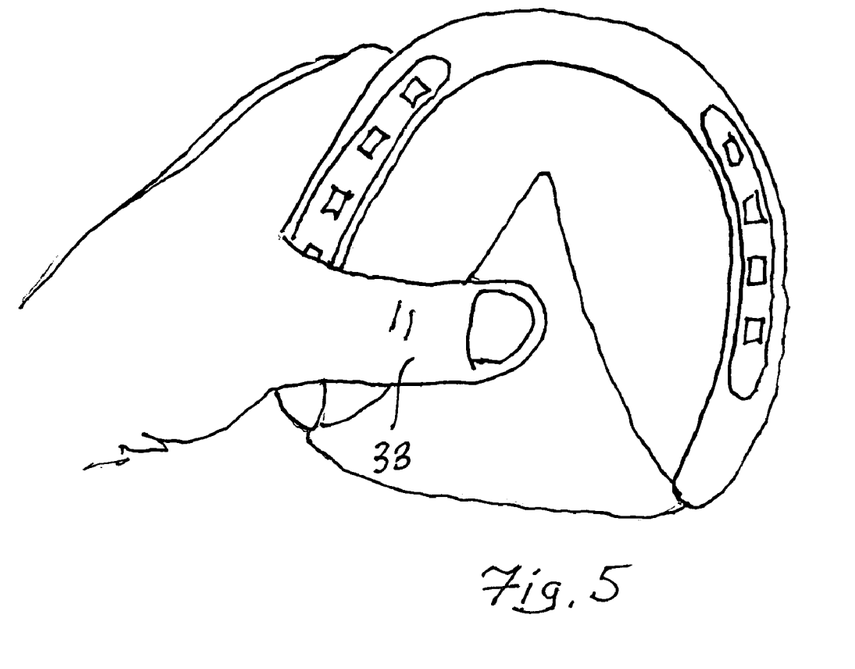
FIG. 5 is a bottom view of a horses foot showing the farrier's thumb positioned on the actual center of the hoof used for measuring the break-over point.
Figure 6:
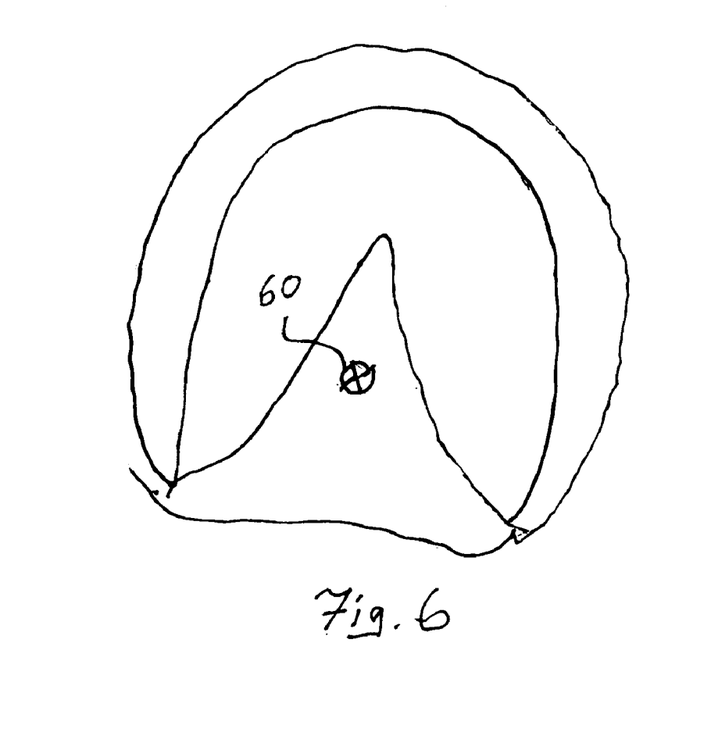
FIG. 6 is a bottom view of a horses foot showing a mark placed on the actual center of the hoof used for measuring the break-over point.

FIG. 5 is a bottom view of a horses foot showing the farrier's thumb positioned on the actual center of the hoof used for measuring the break-over point. FIG. 6 is a bottom view of a horses foot showing a mark 60 placed on the actual center of the hoof. Once the actual center mark 60 is determined, a device providing means for measuring distances on the bottom of the hoof from the actual center 60 can be used for determining the break-over point.

Figures 7, 8:
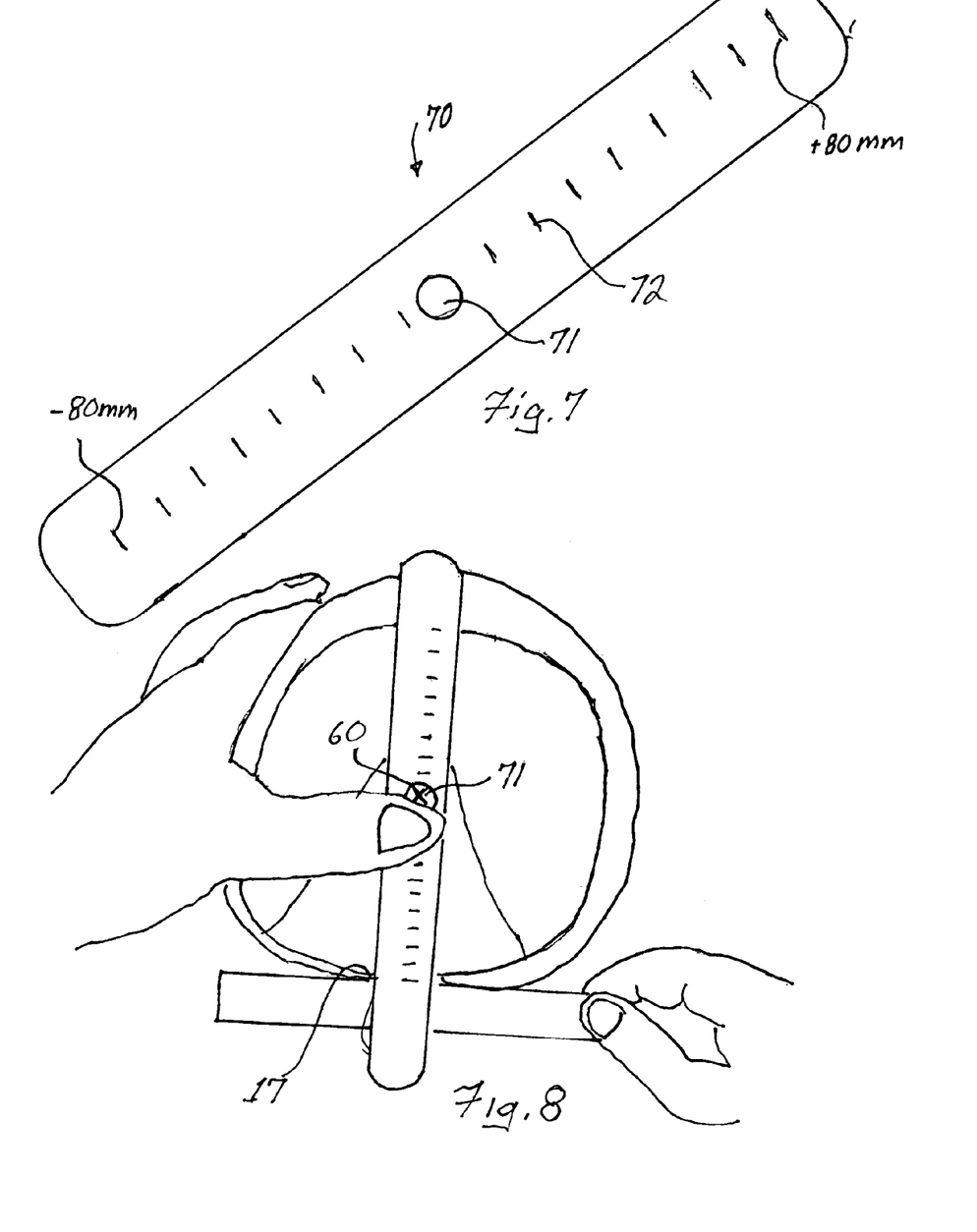
FIG. 7 is a top plan view of a measuring device operable for measuring the position of the break-over plane on the hoof.
FIG. 8 is a bottom view of a horses foot showing a the device of FIG. 7 positioned on the hoof such that the center indicia on the device overlies the mark placed on the actual center of the hoof and the distance from the mark to the heel being determined.

FIG. 7 is a top plan view of a measuring device 70 in accordance with the present invention that is operable for measuring the position of the break-over 11 line on the hoof. The measuring device 70 is an elongate strip of a preferably transparent material having a center indicia 71 and a plurality of equally spaced gradations 72 indicated thereon wherein the gradations 72 are symmetrically spaced from the center indicia and are indicative of the distance from the center indicia 71 to the gradation in both directions.

FIG. 8 is a bottom view of a horses foot showing a the device 70 of FIG. 7 positioned on the bottom of the hoof such that the center indicia 71 on the device overlies the mark 60 placed on the actual center of the hoof. The distance L from the mark 60 to the heel bulb 17 is determined and the distance L from the mark to the heel is marked on the device as shown at line 90 in FIG. 9.

Figure 9:
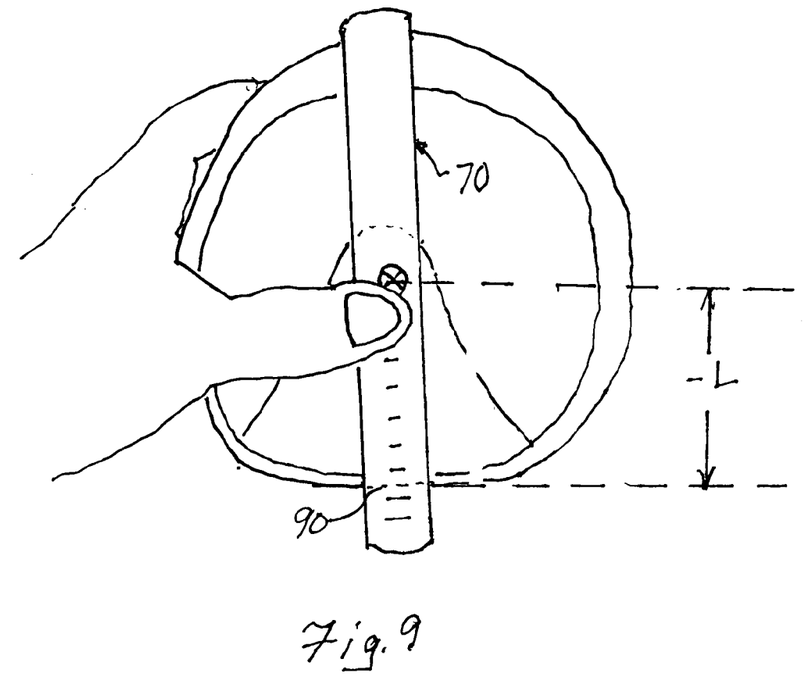
FIG. 9 is as FIG. 8 with the distance from the center mark to the heel being marked on the device.
Figure 10:
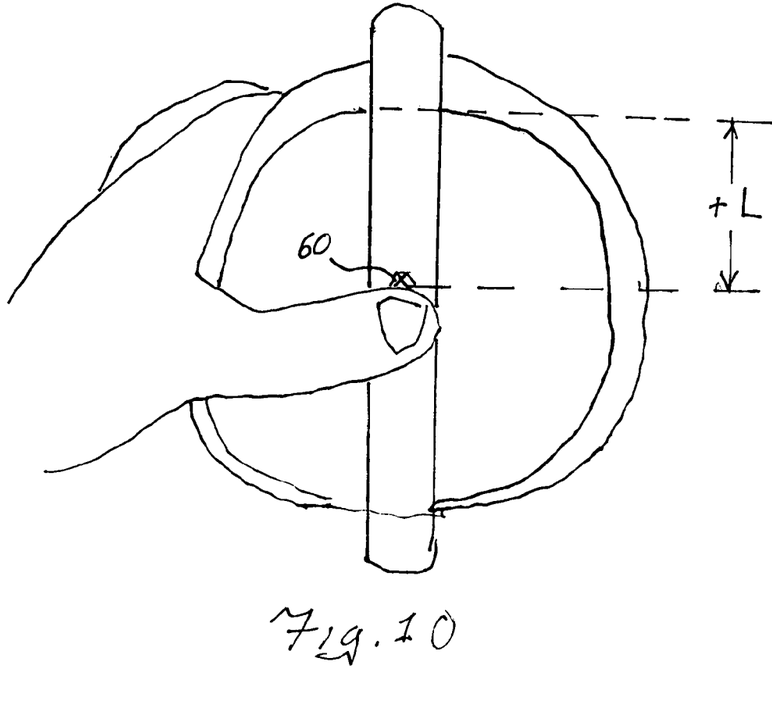
FIG. 10 is as FIG. 9 with the distance from the center mark to the heel being marked on the device forward of the center indicia a distance equal to the heel-center mark distance determined in FIG. 8 to determine the position of the break-over plane.
Figure 11:
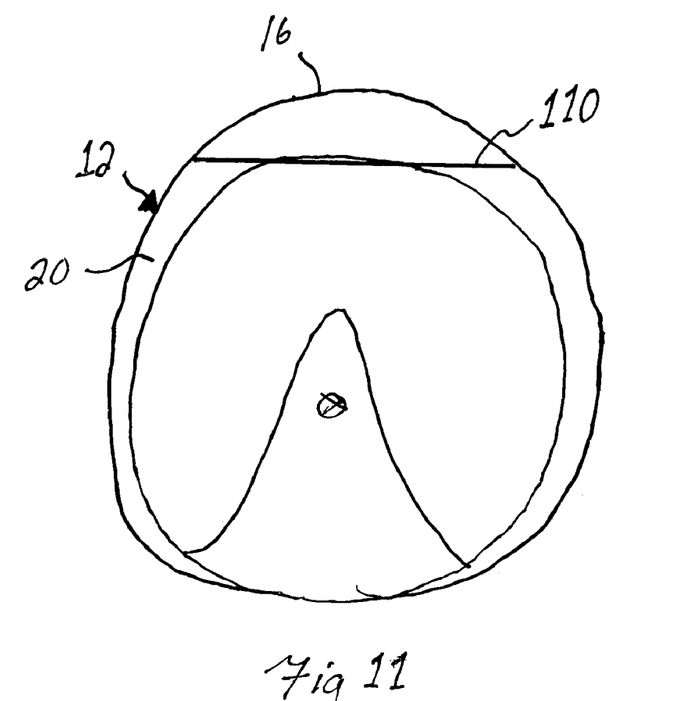
FIG. 11 is a bottom view of a horse's foot showing the break-over line indicating the position where the break-over plane intersects the plane defined by the bottom of the hoof.

FIG. 10 is as FIG. 9 with the distance L from the center mark to the heel being marked on the device forward of the center indicia a distance L equal to the heel-center mark distance L determined in FIG. 8. A break-over line 110 is then drawn on the hoof perpendicular to the direction of measurement of L as shown in FIG. 11. FIG. 11 is a bottom view of a horse's foot showing the break-over line 110 indicating the position where the break-over plane intersects the plane defined by the bottom of the hoof 20.

Figure 12:
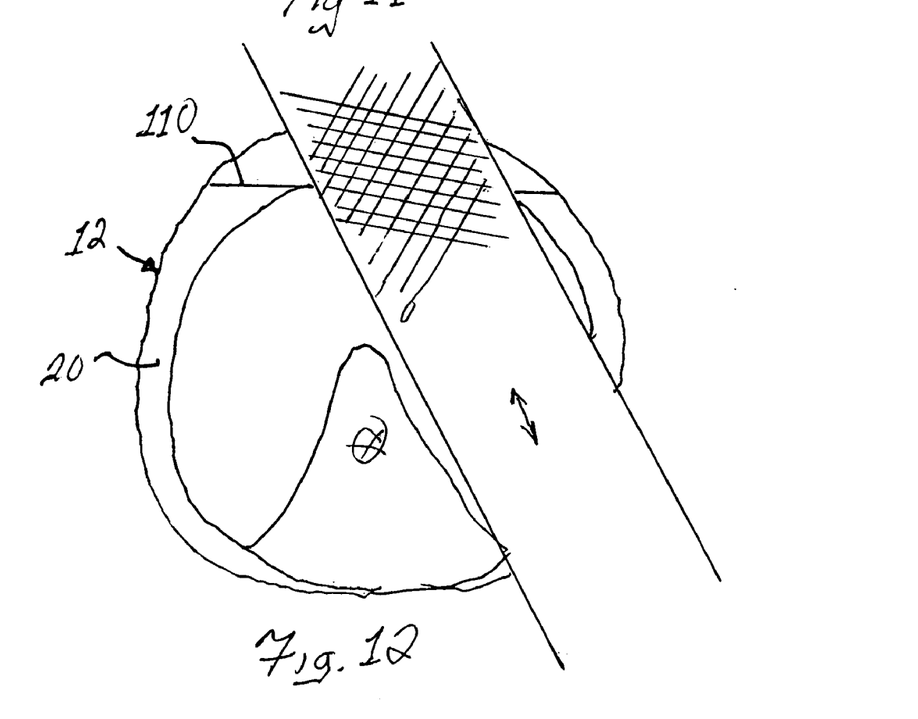
FIG. 12 illustrates a rasp being used to bevel the portion of the hoof forward of the break-over line.
Figure 13:
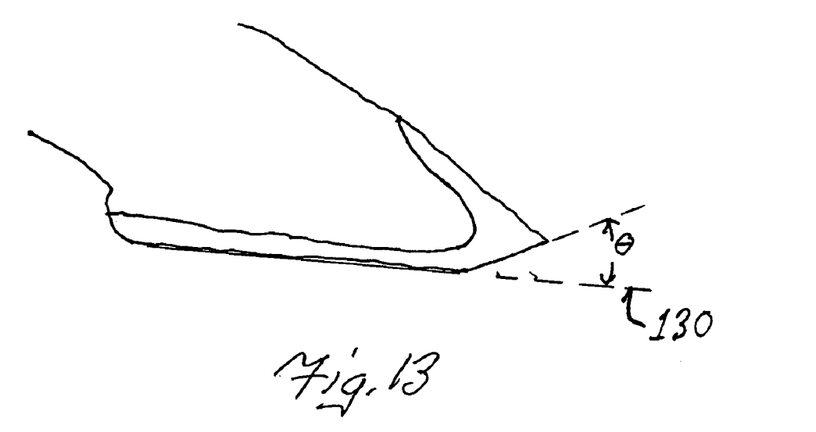
FIG. 13 is a top view showing the dressed dorsal wall of the hoof.

FIG. 12 illustrates a rasp being used to bevel the portion of the hoof forward of the break-over line. If the forward portion of the hoof (i.e., the portion of the hoof forward of the break-over line 110) is correctly beveled, the pressure exerted by the inner wall of the hoof and laminae is reduced and the potential for injury to the foot, particularly during locomotion, is also reduced. FIG. 13 is a side view of a hoof showing the forward edge of the bottom of the hoof beveled by an angle Θ relative to the (flat) bottom plane 130 of the hoof.

Figure 14:
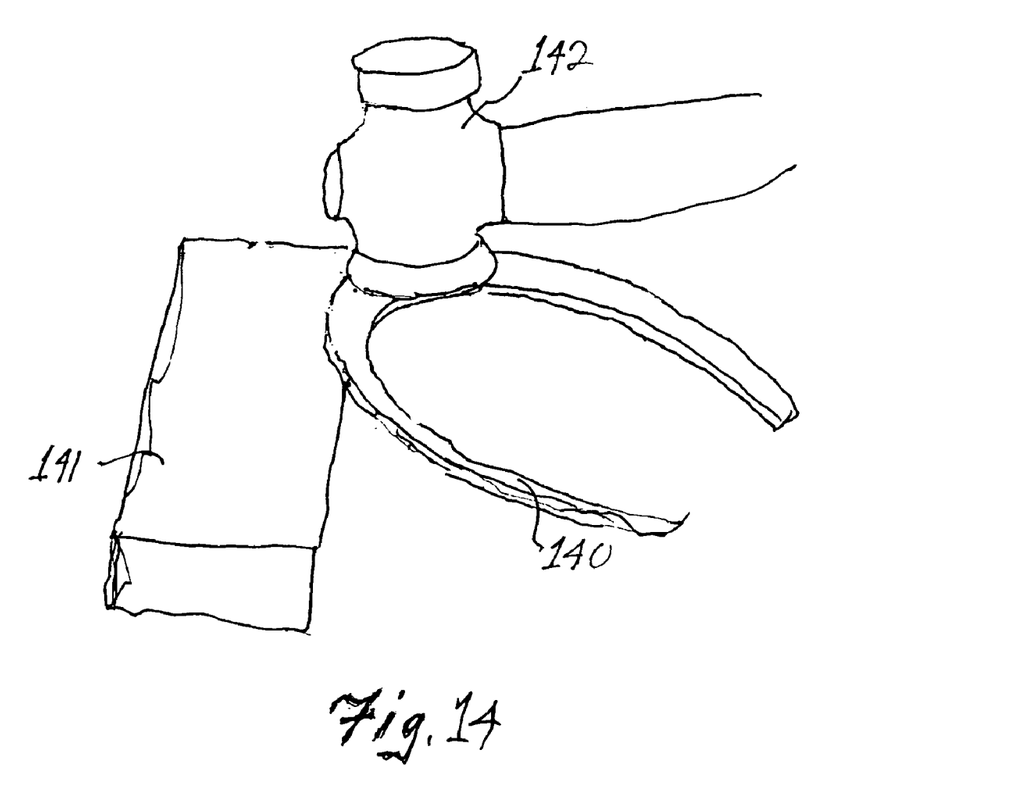
FIG. 14 shows a horseshoe being shaped at the forward edge thereof to conform to the contour presented by the trimmed, beveled bottom surface of the hoof.
Figure 15:
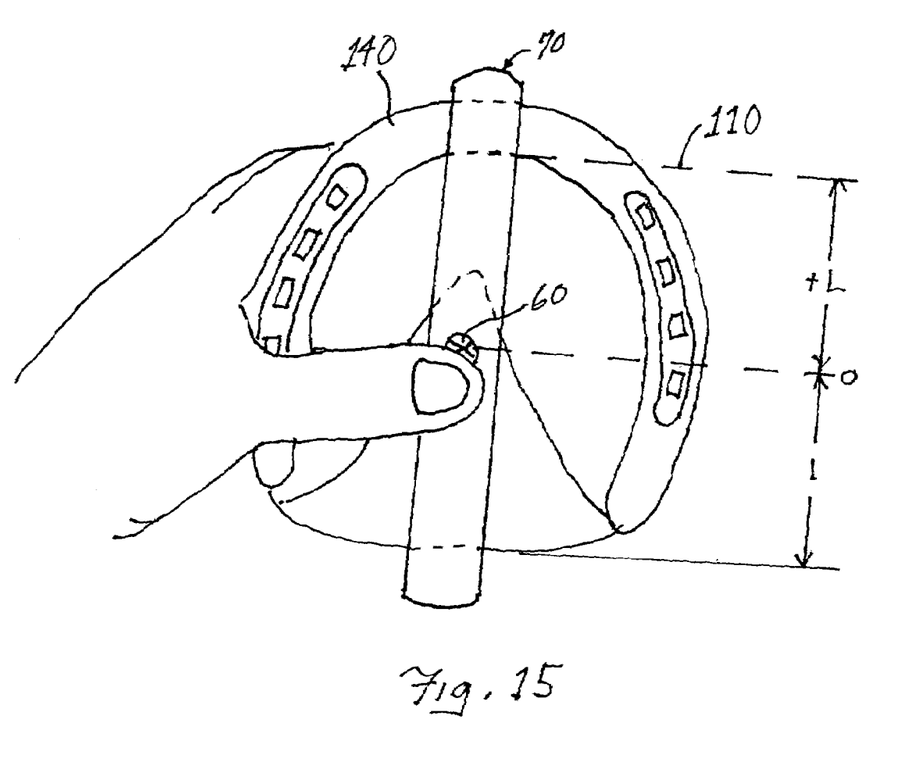
FIG. 15 is a bottom view of the measuring device pressed against the shod hoof illustrating the heel and the break-over line equidistant from the center mark when the horse is freshly shod.

FIG. 14 shows a horseshoe being shaped at the forward edge thereof to conform to the contour presented by the trimmed, beveled bottom surface of the hoof. The horseshoe is tilted an angle Θ relative to the plane of the anvil 141 and a sledge hammer 142 employed to bend the forward portion of the horseshoe forward of the break-over line to conform to the bottom surface of the hoof. The horseshoe is then nailed to the hoof as shown in FIG. 15. FIG. 15 is a bottom view of the shod hoof showing the measuring device 70 pressed against the shod hoof illustrating the heel and the break-over line equidistant from the center mark 60 when the horse is freshly shod.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A method for shoeing a horse comprising the steps of: (a) placing an index finger on the center of the coronet band on the upper surface of a horses hoof; then (b) bringing a thumb in opposition to the index finger to rest on the bottom of the hoof; then (c) marking the actual center of the hoof, the actual center being defined as the point where the thumb contacts the hoof; then (d) placing a tool consisting essentially of an elongate strip having a length and a visible center indicia disposed midway along said length, said center indicia representing zero on a numerical scale, and plurality of equally-spaced numerical gradations ruled laterally on a surface of said strip outwardly from said center indicia, said gradations extending from zero to around 100 mm in each direction from said center indicia against the bottom of the hoof such that the orientation of the tool along the length of the tool runs in an anterior-posterior direction and wherein the center indicia overlies the actual center of the hoof; then (e) measuring the distance L from the center indicia to the heel of the hoof; then (f) measuring a distance L forward of the center indicia and marking the hoof with a transverse break-over line; then (g) beveling a portion of the hoof forward of the break-over line an angle $\Theta$ relative to the plane of the, the hoof thereafter being a prepared hoof.

2. The method of claim 1 further comprising the step of bending the forward end of a horseshoe an angle $\Theta$ relative to the plane of the horseshoe such that the horseshoe conforms to the contour of the prepared hoof then nailing the horseshoe to the hoof.

* * * * *